United States Patent

Petri

Patent Number: 5,806,368
Date of Patent: Sep. 15, 1998

[54] GEARSHIFT DEVICE FOR A SEMIAUTOMATICALLY SHIFTABLE CHANGE-SPEED GEARBOX

[75] Inventor: Hans Petri, Much, Germany

[73] Assignee: Ford Global Technologies, Inc., Dearborn, Mich.

[21] Appl. No.: 675,441

[22] Filed: Jun. 28, 1996

[30] Foreign Application Priority Data

Jul. 3, 1995 [DE] Germany .................. 195 24 116.9

[51] Int. Cl.$^6$ ................................. F16H 59/04
[52] U.S. Cl. .......................... 74/335; 74/473 R
[58] Field of Search ................. 74/335, 473 R; 477/115

[56] References Cited

U.S. PATENT DOCUMENTS

| | | | |
|---|---|---|---|
| 4,570,765 | 2/1986 | Makita | 74/335 X |
| 5,566,579 | 10/1996 | Willford et al. | 74/335 |

FOREIGN PATENT DOCUMENTS

3331223 C2  3/1984  Germany .

Primary Examiner—Allan D. Herrmann
Attorney, Agent, or Firm—Frank G. McKenzie

[57] ABSTRACT

In a gearshift device for a semiautomatically shiftable change-speed gearbox of a motor vehicle, comprising a driver-operated clutch and a gearshift lever, movable only in a single shift lane, by means of which various shifter forks which are operable through an electromagnetically actuatable preselector device and act on synchronizers in the change-speed gearbox can be actuated. The gearshift lever is in the form of a tilting gearshift lever which always returns to its starting position; the shifting movement of the gearshift lever can be transferred by way of a gearshift linkage or a gearshift cable to a shifter slide (3) which is guided linearly in the direction transverse to a shifter shaft (1) of the change-speed gearbox; and the shifter slide (3), guided by means of upper and lower guide rails (4 and 5), cooperates with one of two transfer levers (9 and 11) by way of an upper or a lower pin-and-slot connection (22/21 and 19/18 respectively); and the shifter shaft (1) carries a fixed shifter hub (10) having a selector sleeve (17) fitted axially movably thereon which is slidable by means of an electromagnetically operable preselector device so as to come into driving connection with a clutch tooth system (14 and 15) on the respective transfer lever (9 and 11) and convert a tilting shift movement of the gearshift lever into one of two possible turning movements of the shifter shaft (1).

6 Claims, 6 Drawing Sheets

BETÄTIGUNGSLOGIK – GANGWECHSEL

NACH →

↓ VON

| | N | 1 | 2 | 3 | 4 | 5 | 6 |
|---|---|---|---|---|---|---|---|
| | UP/DOWN | NO/NS | NS/NO | NO/NS | NS/NO | NO/NS | NS/NO |
| 1 | SN | ▨ | SS | OS | SS | OS | SS |
| 2 | ON | SS | ▨ | OO | SO | OO | SO |
| 3 | SN | SO | OO | ▨ | SS | OS | SS |
| 4 | ON | SS | OS | SS | ▨ | OO | SO |
| 5 | SN | SO | OO | SO | OO | ▨ | SS |
| 6 | ON | SS | OS | SS | OS | OO | ▨ |

BEDEUTUNG:

| GANG | GANG |   |
|------|------|---|
| RAUS | REIN |   |
| A | B | C |

N... NEUTRAL
S... STANDARD-PFAD
O... OPTIONALER PFAD

FIG. 4

GEARSHIFT DEVICE FOR A SEMIAUTOMATICALLY SHIFTABLE CHANGE-SPEED GEARBOX

BACKGROUND OF THE INVENTION

1. Field of the Invention

The invention relates to a gearshift device for a semiautomatic shiftable change-speed gearbox of a motor vehicle.

2. Discussion of the Prior Art

A gearshift device of this kind is disclosed in German patent 33 31 223. The electromagnetically operable preselector device comprises various push-buttons operated by the driver, who selects one of three possible shift lanes. The driver, by operation of the gearshift lever, then selects one of the two different available gears.

Consequently, this known gearshift device has the disadvantage that the driver, in addition to moving the gearshift lever forwards or backwards out of its middle position, must each time also operate one of the three push-buttons in order to shift to the next gear appropriate for the operation of the vehicle.

The end result is that the known gearshift device only offers a semiautomatically shiftable change-speed gearbox for a motor vehicle which, in each of two or three shifting ranges, can only be further shifted between a higher and a lower gear.

SUMMARY OF THE INVENTION

It is an object of the invention to improve a gearshift device for a semiautomatically shiftable change-speed gearbox of a motor vehicle of the kind referred to above so that the driver can shift through all the gears present in the change-speed gearbox simply by operating the clutch and by moving the gearshift lever, which can only be moved forward or backward in one shift lane, while an electromagnetic preselector device ensures that each time only the gear appropriate for the prevailing operating condition of the motor vehicle can be engaged.

According to the invention, this object is achieved if, in a gearshift device for a semiautomatically shiftable change-speed gearbox of a motor vehicle of the kind referred to above, the gearshift lever is in the form of a tilting gearshift lever, which always returns to its starting position. The shifting movements of the gearshift lever are transferred by way of a gearshift linkage or a gearshift cable to a shifter slide, which is guided linearly in the direction transverse to a shifter shaft of the change-speed gearbox. The shifter slide is guided by means of upper and lower guide rails and has projections through which it cooperates with one of two transfer levers by way of an upper or a lower pin-and-slot connection respectively. The shifter shaft carries a fixed shifter hub having a selector sleeve axially movably thereon, which sleeve is slidable by means of the electromagnetically operable preselector device so as to come into driving connection with a clutch tooth system on the respective transfer lever and to convert a tilting shifting movement of the gearshift lever into one of two possible turning movements of the shifter shaft.

This arrangement enables the driver of the vehicle to shift through all the gears of the change-speed gearbox simply by moving the gearshift lever.

The electromechanically actuatable preselector device consists essentially of a microprocessor, which is provided with operating parameters of the internal combustion engine and of the change-speed gearbox by means of corresponding sensors with suitable signals and, depending on the most suitable gear of the motor vehicle as determined therefrom, moves the axially displaceable selector sleeve on the shifter shaft electromagnetically so that engagement of the appropriate gear is effected through the tilting, shifting movement of the gearshift lever.

The electromagnetically operable preselector device preferably forms part of a computer-controlled overall system such as is already required for the control of the internal combustion engine and is already supplied with a large number of necessary parameters through corresponding sensors, and to which only corresponding additional sensors, e.g., for the gear which is engaged and the like, are added.

BRIEF DESCRIPTION OF THE DRAWINGS

The present invention will now be described in more detail, by way of example, with reference to an embodiment shown in the drawings, in which:

FIG. 4 is a table showing the operating strategy of the gearshift device during an upshift and a downshift through the various gears.

DESCRIPTION OF A PREFERRED EMBODIMENT

Figure 1:
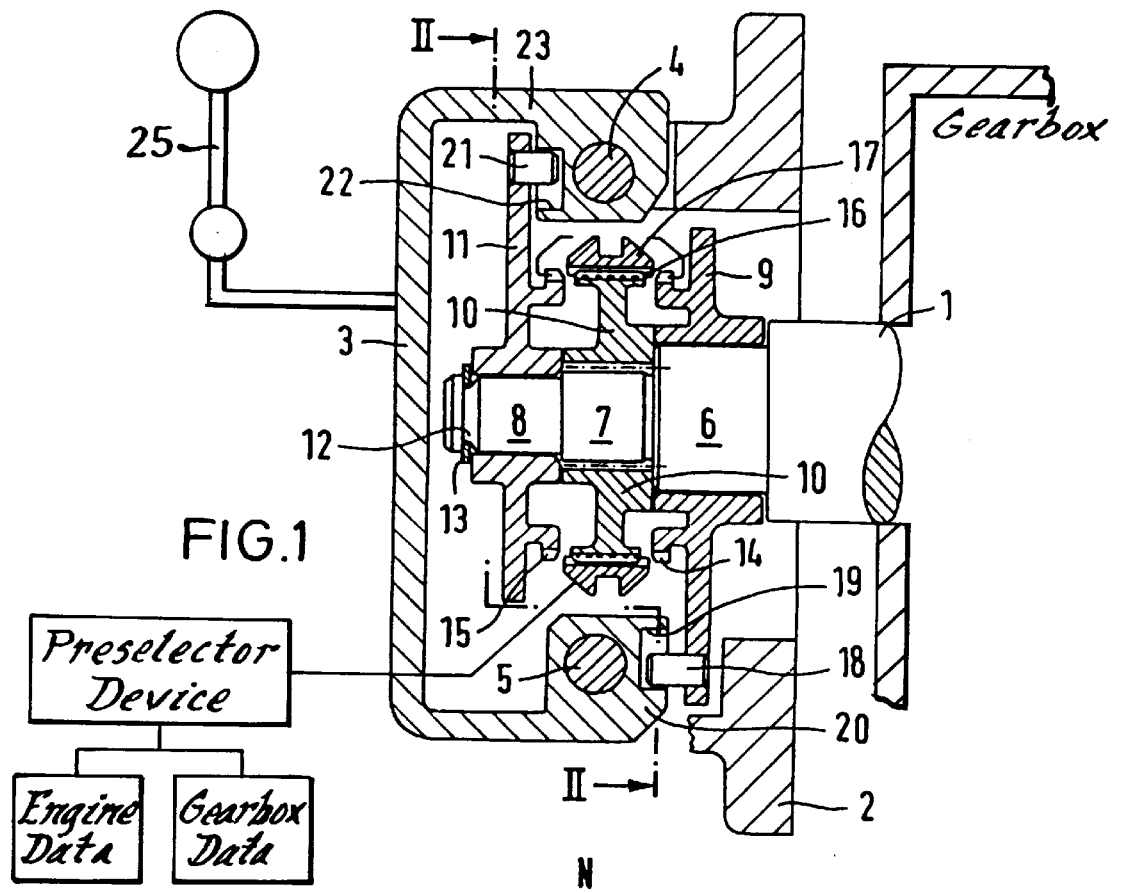
FIG. 1 shows a vertical section through the region of the gearshift device of the present invention.

Referring first to FIG. 1, a shifter shaft 1 is mounted in a gearbox housing and extends axially beyond the end of the gearbox housing.

The free end of the shifter shaft extends into a gearshift device housing 2 attached to the gearbox housing in which a shifter slide 3 is fitted to slide linearly on upper and lower guide rails 4 and 5 in a direction transverse to the shifter shaft 1.

The free end of the shifter shaft 1 is provided with three stepped shoulders 6, 7, and 8, a first transfer lever 9 carried rotatably on the first shoulder 6, a shifter hub 10 carried nonrotatably on the second shoulder 7, to which it is splined, and a second transfer lever 11 carried rotatably on the third shoulder 8. The assembly is held together in the axial direction by a retaining ring 13 inserted in a groove 12 at the end of the shifter shaft 11. Each of the two transfer levers 9 and 11 is provided on its side facing toward the shifter hub 10 with a respective clutch tooth system 14 and 15, which is brought into engagement with the internal tooth system 16 of a selector sleeve 17 carried on the shifter hub 10 once the selector sleeve 17 has been moved by an electromagnetically operable preselector device (not shown) into a position on the left or right in FIG. 1.

On the first transfer lever 9, a pin 18 is fitted at its lower end, which cooperates with a slot 19 in a projection 20 of the shifter slide 3. In a similar manner, the second transfer lever 11 is provided at its upper end with a pin 21, which cooperates with a slot 22 in a projection 23 of the shifter slide 3.

The functioning of the gearshift device of the invention will now be described in more detail with reference to FIG. 2.

Figure 2:
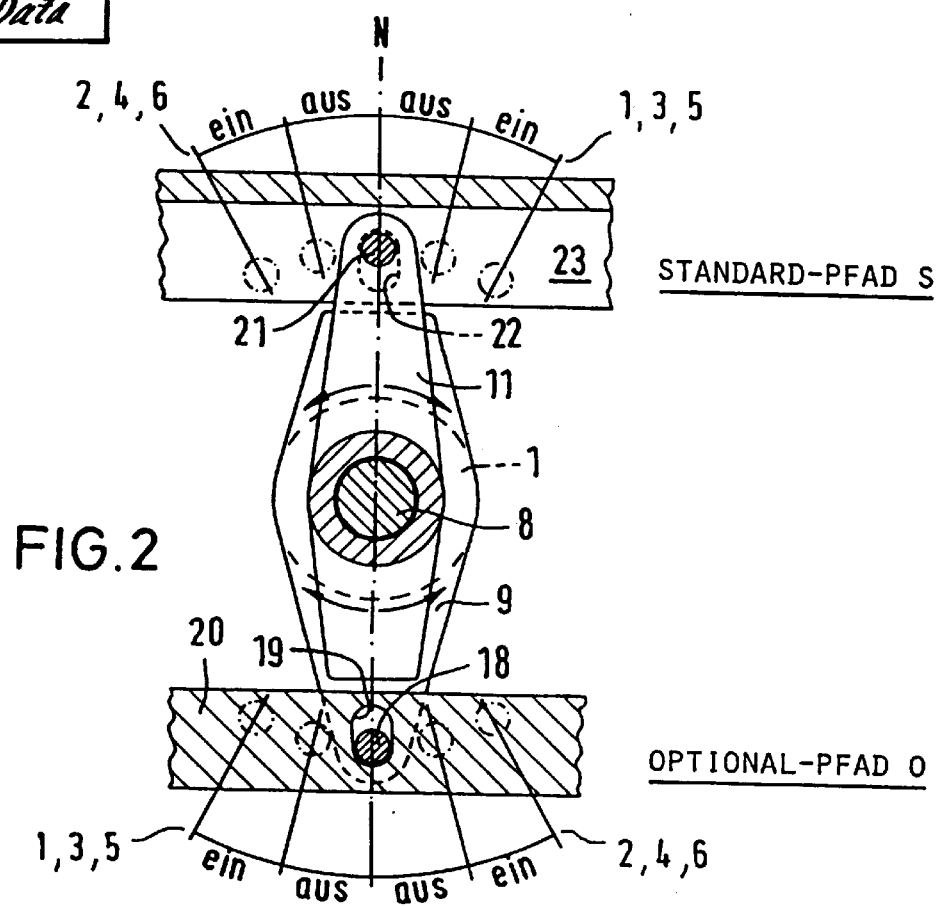
FIG. 2 shows a vertical section or view along the line II—II in FIG. 1.

In FIG. 2, only those parts of the shifter slide 3 and of the first and second transfer levers 9 and 11 that are of importance for the description of the mode of operation are shown. On the first transfer lever 9 is fitted a pin 18, which engages in a slot 19 on the projection 20 of the shifter slide 3. On the second transfer lever 11 is fitted a pin 21, which cooperates with a slot 22, which is formed in the projection 23 of the shifter slide 3.

The starting position of the two transfer levers 9 and 11 is shown by a broken vertical line. Corresponding curved arrows pointing to the left and right show the possible movements of the two transfer levers 9 and 11.

Adjacent the two pins 18 and 21, along their pivot radius, circles are drawn which show the possible positions of the pins 18 and 21 in connection with the shifter shaft 1, which they actuate, and the gears, which are thereby disengaged or engaged. In the upper part of FIG. 2, the possible course of movement for the pin-and-slot connection 22/21 is indicated as standard path S, in which, during a movement from the starting position, disengagement of a gear takes place, immediately followed by engagement of another gear. The gears which can thereby be shifted are indicated by the bold arabic numerals 1, 3, 5 and 2, 4, 6. 15 In a similar manner, in the lower part of FIG. 2, the course of movement of the pin-and-slot connection 19/18 is indicated as optional path O.

Figure 3:
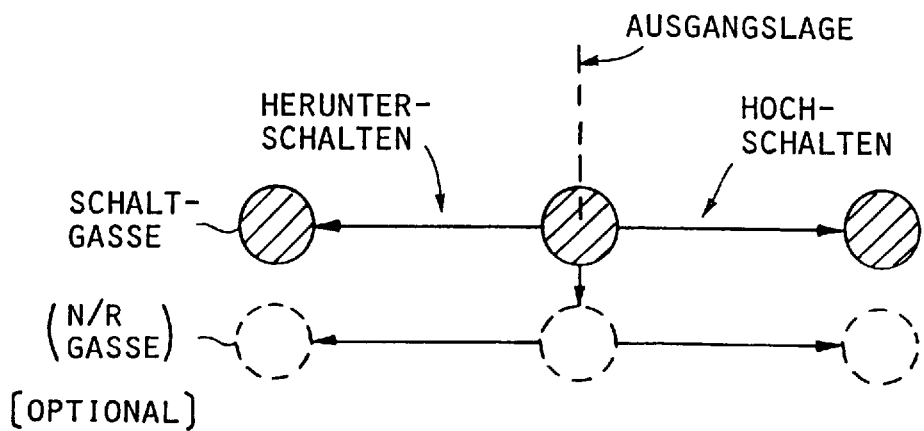
FIG. 3 shows the shifting movements of the gearshift lever in a shift lane, viewed from above, set against the movement functions for the shift as seen from the side.
Figure 3:
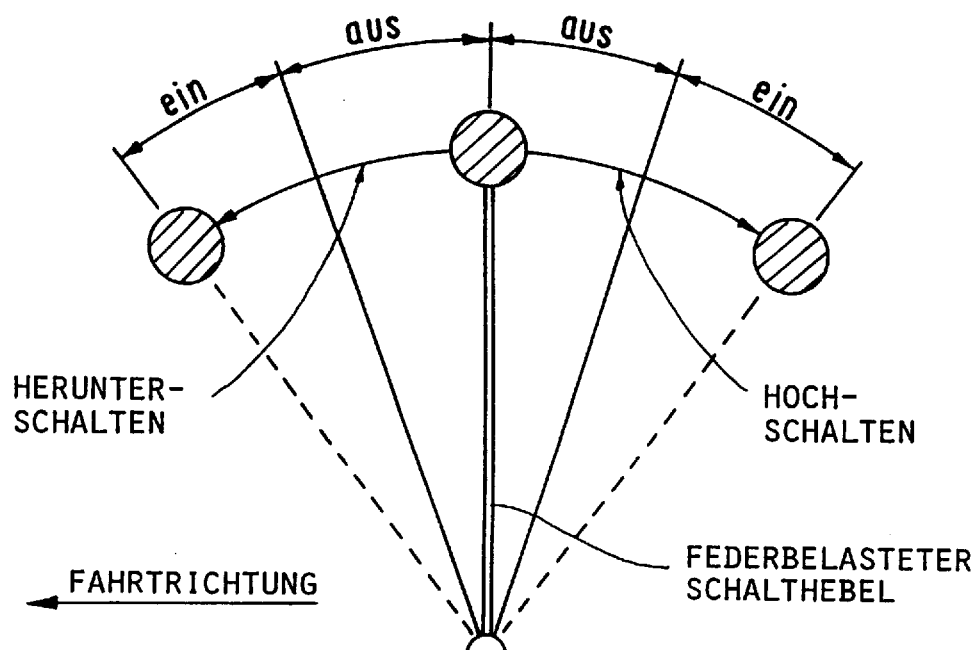

In FIG. 3, the shifting movement of the gearshift lever 25 in a shift lane is shown from above, with the movement functions for the actual shift of the gears shown opposite in a side view of the gearshift lever.

The normal direction of travel of the motor vehicle is shown by an arrow, and the spring-loaded gearshift lever, which can be moved in one shift lane, and optionally also in a second, N/R lane, always returns to its starting position. As can be seen from the lower part of FIG. 3, gearshift movement for an upshift or a downshift in each case corresponds to disengagement and engagement of a gear speed.

In the Table of FIG. 4, the operation strategy for the coupling movement of the selector sleeve 17 is indicated with reference to the clutch tooth systems 14 and 15 of the transfer levers 9 and 11. For each step of shifting from one gear to another gear, the course of the movements via the standard or the optional path is shown.

The mode of operation of the gearshift device of the invention is explained below.

As already explained, all that is required when it is desired to change gear, the driver operates the clutch and moves the tilting gearshift lever 25 forward or backward, the tilting gearshift lever 25 being pulled toward the driver if an upshift is desired and pushed away for a downshift. After each shifting movement, the tilting gearshift lever 25 immediately moves back to its neutral starting position.

As has been explained above, an electromagnetically actuatable preselection device preselects, by means of a stepping motor, the appropriate shift lane, e.g., for the first and second gear, according to the operating parameters of the vehicle.

Figure 5:
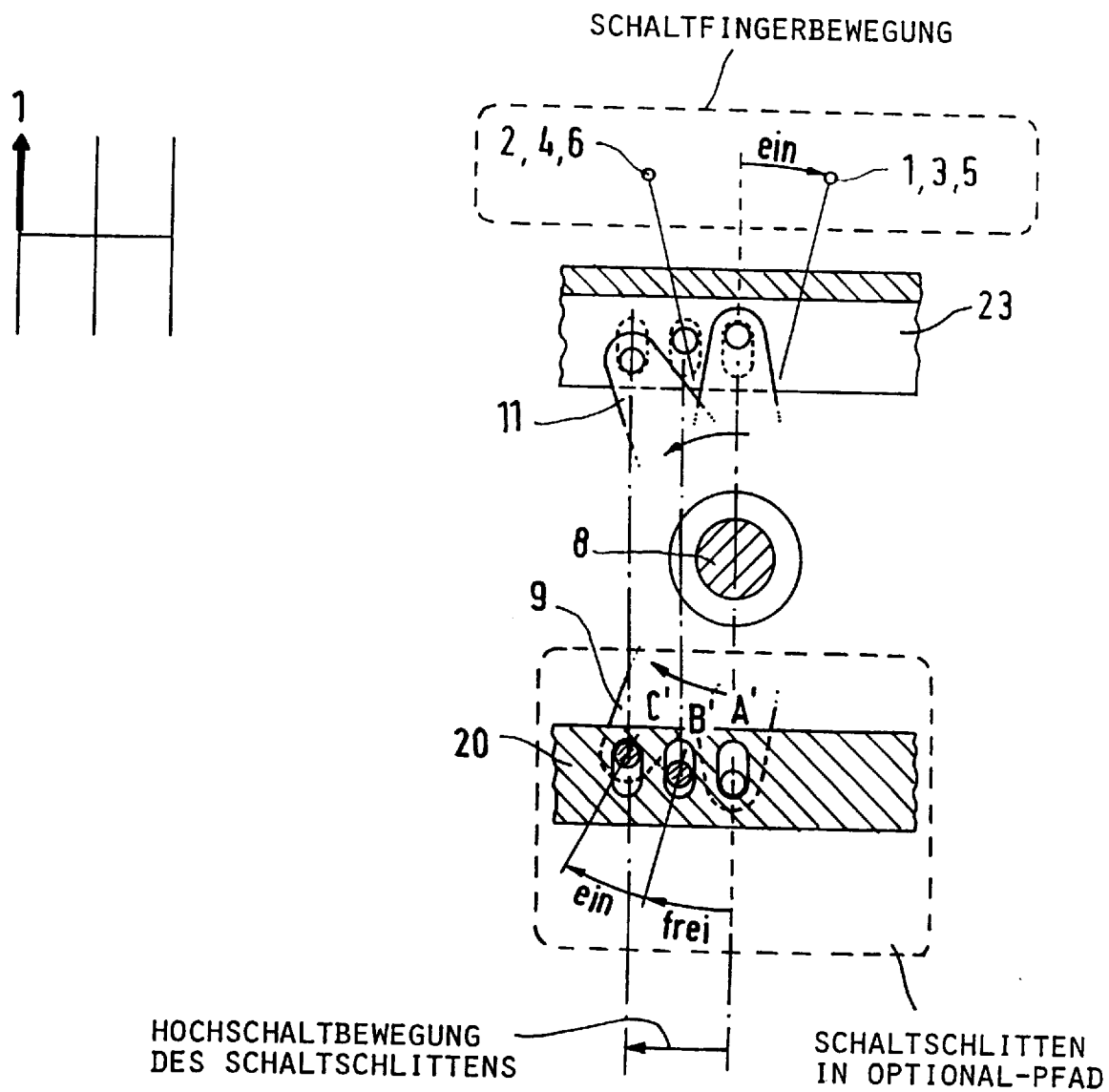
FIGS. 5, 6, and 7 show the course of movements at the shifter slide during a particular shift function of the gearshift device according to the invention.

In FIG. 5, a conventional shift diagram of a countershaft change-speed gearbox, e.g., with six forward gears one to six, is shown on the left, and shifting into first gear with the vehicle at a standstill will be described.

Assuming the vehicle is stationary and the driver wishes to engage first gear by operating the clutch and pulling the tilting gearshift lever rearward, the shifter slide 3 follows the upshift movement path shown in FIG. 5, and the pin-and-slot connection 22/21 first makes a free run and then engages the first gear over the angular range marked "in".

Immediately after the actuation, the gearshift lever is again returned to its neutral position.

Figure 6:
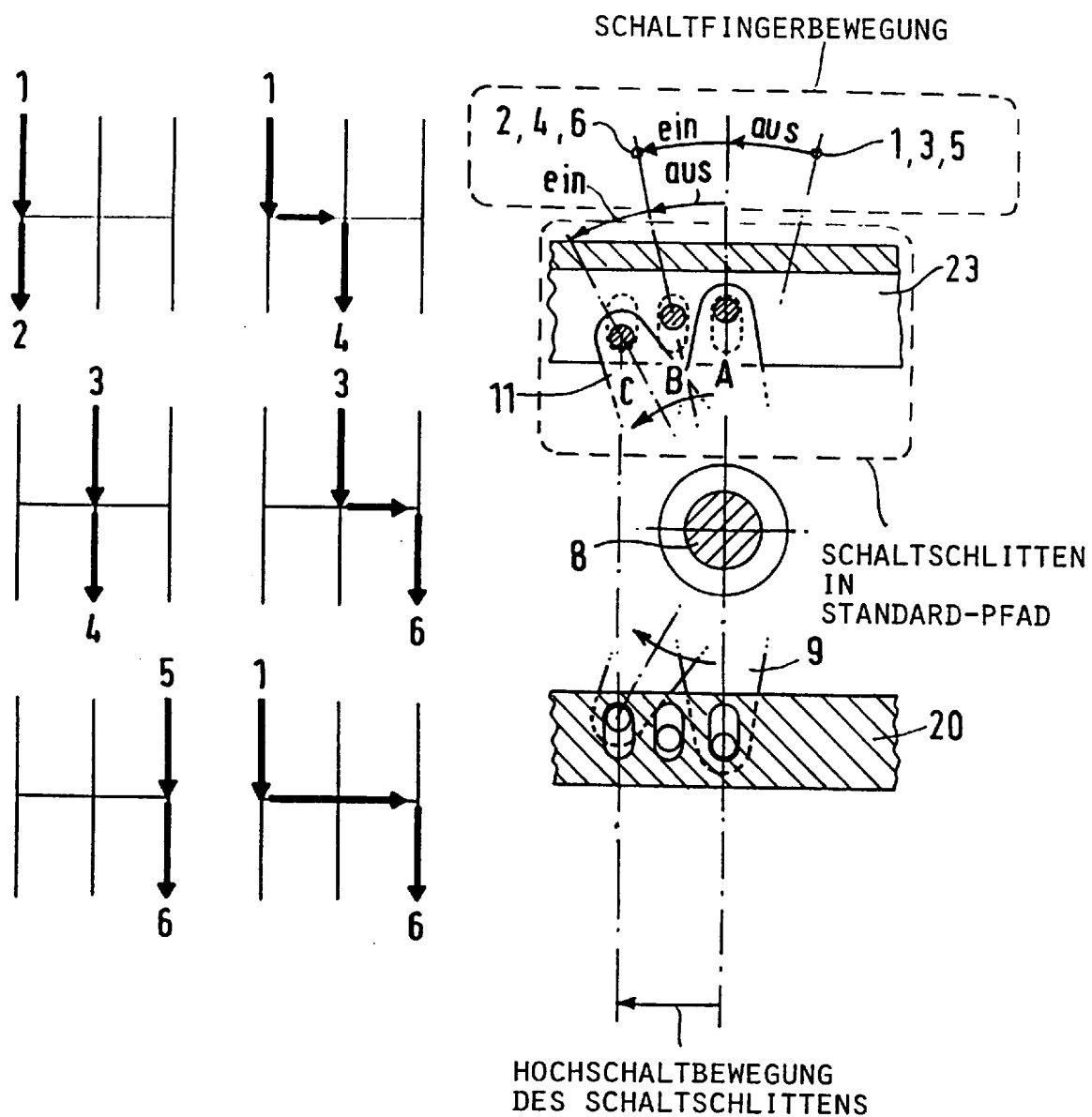

In FIG. 6, on the left, the possible shifts of the various gears are shown in a conventional shift diagram. The possible upshifts will be explained.

If the driver of the vehicle wants to shift into the next higher gear, i.e., second gear, then, since what is desired is an upshift, the driver must again pull on the tilting gearshift lever. In the first region of the angular section marked "out", the first gear is disengaged. In the second region of the angular range marked "in", the second gear is engaged.

In the upshift movement, the disengagement of the first gear, and also the engagement of the second gear, are executed by means of transfer lever 11, whose pin-and-slot connection 21/22 is located above the shifter shaft 1, in the standard path described above.

So long as a shift, referring to the H shift diagram and the course of movement of the shift selector finger, maintains the same direction of movement, the transfer lever 9/11 is not changed during the shift, that is, the connection remains either in the standard path or the optional path.

Figure 7:
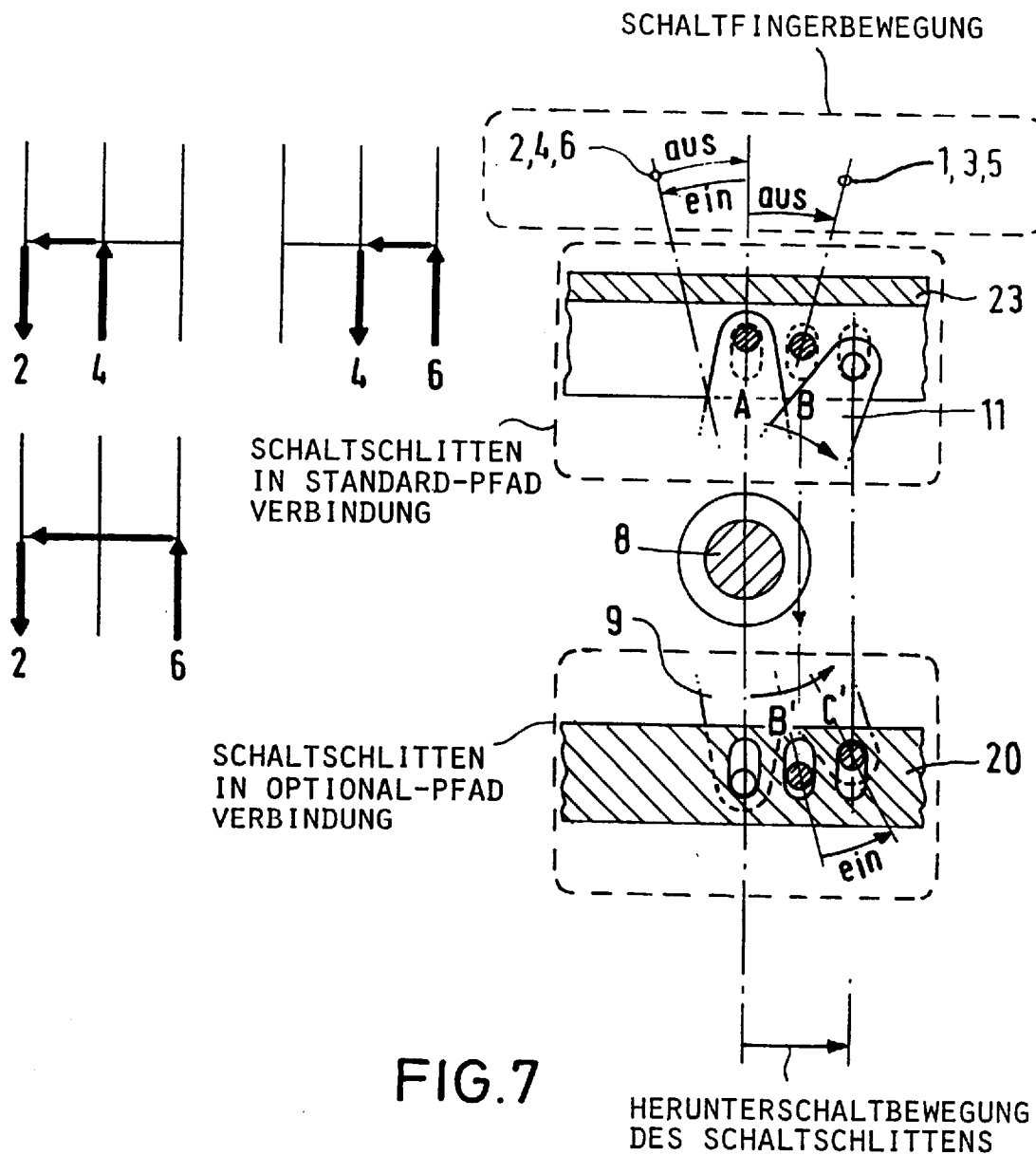

In FIG. 7, the possible shifts in a conventional shift pattern are shown on the left, in which, for example, after heavy braking of the vehicle, one or more gears are to be skipped in the course of a downshift.

If, therefore, for example, with fourth gear engaged, because of greatly reduced speed as a result of heavy braking, the desired downshift is to take place appropriately directly to second gear, then, after fourth gear has been disengaged, the selected shift lane must be changed and the shift movement must take place in the opposite direction, in order to engage second gear.

Assuming, for example, that for disengagement of fourth gear a clockwise rotation of the shifter shaft 1 is required, it is easy to understand that for engagement of second gear a counterclockwise rotation of the shifter shaft counterclockwise is naturally required.

However, the shifting movement available through the tilting gearshift lever 25 proceeds in the same direction as it did before, when disengaging second gear, and, accordingly, this shifting movement, taking place at the shifter slide 3 in the same direction, must be converted into an oppositely-directed turning movement at the shifter shaft 1. This is effected by the transfer of the shifting movement taking place not through the transfer lever 11 but through the transfer lever 9, whose pin-and-slot connection 19/18 is located below the shifter shaft 1.

Both in the case of an upshift and of a downshift, insofar as the direction of movement, referring to the H shift diagram and the course of movement of the shift selector finger, is reversed, an exchange of the transfer levers 9/11 will take place during the shift, that is, the standard path/optional path connection is in each case reversed.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

I claim:

1. A gearshift device for a semiautomatically shiftable change-speed gearbox of a motor vehicle, comprising:

a manually operated pivoting gearshift lever, movable in a shift lane;

a shifter shaft mounted for rotation in two opposite directions about an axis;

transfer levers supported pivotably on the shifter shaft;

a shifter slide displaceable in opposite directions transverse to the shifter shaft in response to shifting movement of the gearshift lever, driveably connected to the transfer levers such that displacement of the shifter slide produces rotation of the levers; and a selector sleeve fixed to the shifter shaft for rotation therewith, for alternately driveably engaging and disengaging the transfer levers, whereby movement of the gearshift lever is converted to rotation of the shifter shaft.

2. The gearshift device according to claim 1, wherein the gearshift lever is moveable in first and second mutually parallel shift lanes.

3. The gearshift device according to claim 2, wherein the second shift lane contains position of the gearshift lever corresponding to neutral and reverse drive positions.

4. The gearshift device of claim 1, wherein the position of said shifter ensures that the speed produced by the gearbox is appropriate for the current operating condition of the vehicle as represented by engine and gearbox data.

5. The gearshift device of claim 1, wherein each transfer lever includes a clutch tooth system; and the shifter includes a hub fixed to the shifter shaft, and a sleeve axially movably on the hub, having clutch teeth engageable and disengageable alternately with the clutch tooth system of the transfer levers.

6. The gearshift device of claim 1, wherein the shifter slide further comprises:

rails disposed transverse to the shifter shaft axis, supporting and guiding the shifter slide for displacement linearly in opposite directions in response to shifting movement of the gearshift lever;

first and second projections, each projection having a slot thereon facing and adjacent a transfer lever; and each transfer lever includes a pin fitted in the slot of the adjacent projection, whereby displacement of the shifter slide pivots the transfer levers and shifter shaft about said axis.

* * * * *